(12) United States Patent
Zhang et al.

(10) Patent No.: US 9,071,923 B2
(45) Date of Patent: Jun. 30, 2015

(54) AUTOMATIC ARCHIVING OF AN APPLICATION ON A MOBILE DEVICE

(71) Applicant: CELLCO PARTNERSHIP, Basking Ridge, NJ (US)

(72) Inventors: Ning Zhang, Warren, NJ (US); Charles Lane, Somerest, NJ (US)

(73) Assignee: Cellco Partnership, Basking Ridge, NJ (US)

(*) Notice: Subject to any disclaimer, the term of this patent is extended or adjusted under 35 U.S.C. 154(b) by 302 days.

(21) Appl. No.: 13/722,756

(22) Filed: Dec. 20, 2012

(65) Prior Publication Data

US 2014/0179272 A1  Jun. 26, 2014

(51) Int. Cl.
  *H04W 4/00* (2009.01)
  *H04M 1/725* (2006.01)
  *H04L 29/08* (2006.01)

(52) U.S. Cl.
  CPC .......... *H04W 4/001* (2013.01); *H04M 1/72522* (2013.01); *H04L 67/34* (2013.01); *H04W 4/003* (2013.01)

(58) Field of Classification Search
  CPC ......... H04Q 7/20; H04W 4/001; H04W 12/02

USPC ...................... 455/414.1, 413, 418
See application file for complete search history.

(56) References Cited

U.S. PATENT DOCUMENTS

2010/0248699 A1* 9/2010 Dumais ............... 455/414.1
2013/0173556 A1* 7/2013 Grigg et al. ............ 707/667

* cited by examiner

*Primary Examiner* — Kwasi Karikari
*Assistant Examiner* — Randy Peaches

(57) ABSTRACT

A mobile device includes an automatic archiver program which configures a processor to identify an unused application which satisfies one or more predetermined archiving criteria, and prompts a user to archive the identified application via a user interface. A user interface is provided such that the user may either confirm or decline archiving of the identified application. Upon receiving user input that confirms archiving of the identified application, the application is archived. Several techniques are disclosed to effectively render the application inaccessible by the operating system, so as to prevent the application from executing any background tasks associated with the archived application. The automatic archiver program has root level access to an operating system of a mobile device such that the program may perform access, create, modify and/or delete operations for archiving private data as part of archiving of the application.

21 Claims, 8 Drawing Sheets

US 9,071,923 B2

AUTOMATIC ARCHIVING OF AN APPLICATION ON A MOBILE DEVICE

BACKGROUND

The use of mobile devices such as smart phones, tablets or the like, is rapidly expanding in popularity. Applications for use on such mobile devices are also available, and are also expanding in popularity. Many such applications are pre-installed on the mobile devices upon purchase by the users. The users may also download and install more applications from mobile application stores, according to the users' needs or desires. As the number of applications that a user installs at his or her mobile device increases, it is likely that many of the installed application go unused for prolonged period of times. For example, the user may lose interest in a game application after completing the game, and therefore no longer runs opens the game application. As another example, the user may have installed an application to try out its features, and may have found it uninterested or finds no needs of the application. As another example, the user may prefer to use an application the user has selected and downloaded into the mobile device instead of a pre-installed application originally intended to offer similar functions or services.

The applications that are installed at a user's mobile device that go unused for prolonged periods of time continue to occupy storage space, which is limited in a mobile device. Also, some of the applications may run associated background tasks which are automatically loaded into the memory of the mobile device without any user input. While such background tasks may speed up the execution of their associated applications, if the applications are not used, the tasks merely take up memory and processing power which could be freed up for other applications that the user uses more frequently.

Methods and tools have been provided which allow the users to uninstall applications that the users no longer use, or to close tasks that are running in the background. However, the users are required to identify the applications or tasks that they wish to uninstall or close. As the number of applications that are installed on the user's mobile device increases, such user activities of manually identifying and deleting/closing applications/tasks become inefficient.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
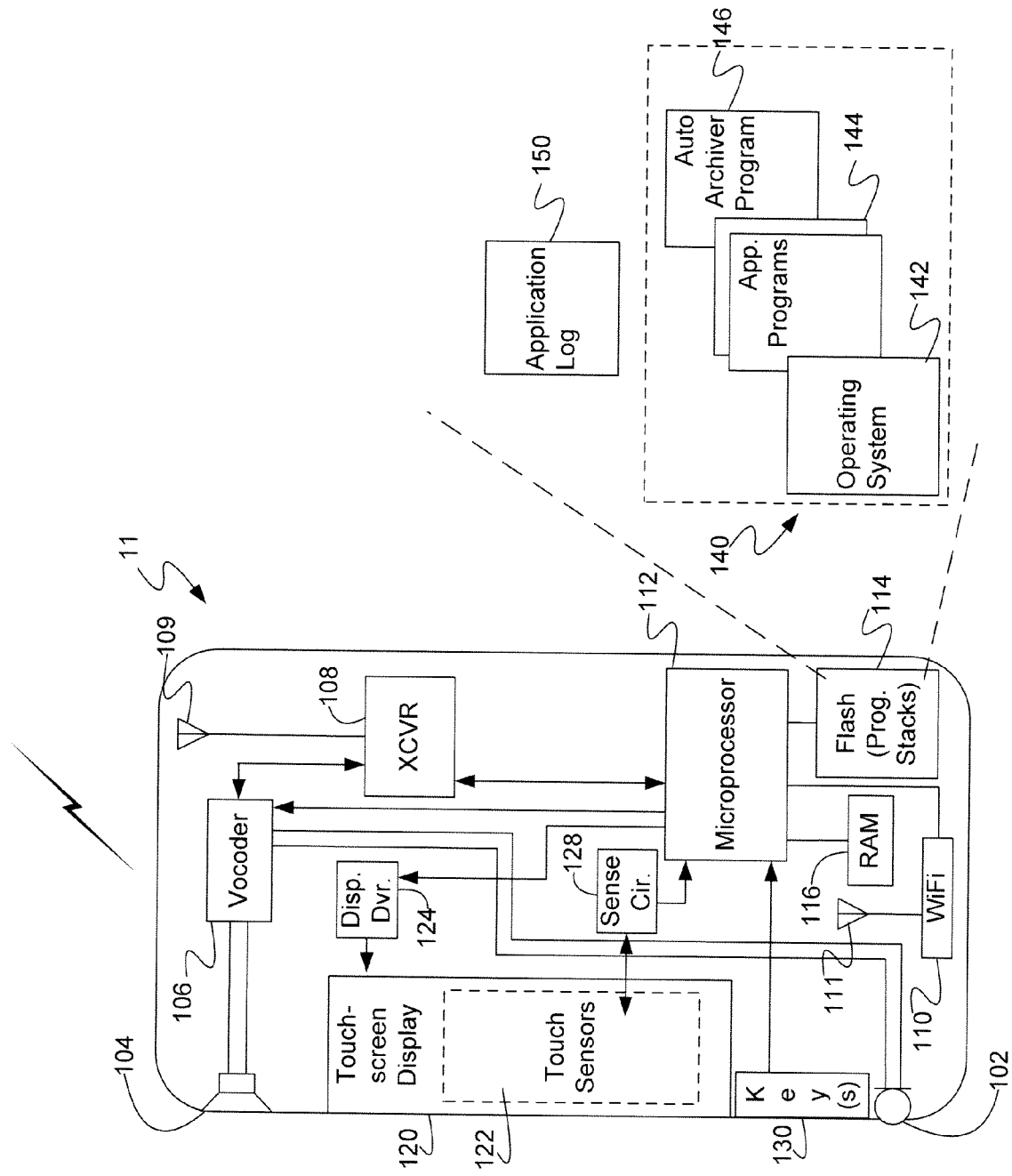
FIG. 1 is a high-level functional block diagram of an exemplary mobile device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In examples disclosed herein, an automatic archiver program automatically determines if usage of a mobile device application meets one or more criteria for archiving, and performs the archiving of the application, for example, if the user decides to archive the particular application.

The automatic archiver program determines whether to archive an application based on, for example, how frequently a user opens the application (e.g., touching on the application icon and brining the application to the foreground). Specifically, the automatic archiver program may determine to archive an application if the user has not opened the application for more than a threshold period of time. The threshold may be set differently for different applications and/or due to different device operating conditions such as amount of remaining memory space of application(s) and/or processing load created by application background tasks. In our example, when the automatic archiver program determines one or more applications to archive, the user is prompted and may confirm or decline archiving of each application identified for possible archiving.

The exemplary automatic archiver program has privileged access (e.g., root level access) to the operating system (OS) running on the mobile device, such that the automatic archiver program has permission to copy, modify or delete private application data (e.g., user-specific data for an application). A third-party application would not normally have such privileged access. Using such privileged access, the automatic archiver program may safely archive and restore the applications without performing any modifications (e.g., rooting) to the mobile device OS that may deny the mobile device of carrier support.

Examples are discussed below in which the application may be archived on the mobile device or may be archived on a cloud-based storage.

When an application is archived on the device, the automatic archiver program "freezes" the application such that the application is not accessible by the user or the OS. The user is no longer able to see the application. Various methods for freezing the application may be used. For example, an application is frozen by removing the application from a list of applications that are accessible by the OS, and also from the list of applications that the user may open. The OS would also be unable to run the application in the background, thereby freeing system resources.

When an application is archived using cloud-based storage (e.g., in a cloud-based server), the application is removed from the device, and all relevant data for the application is moved onto the cloud-based storage. Archiving on the cloud-based storage therefore frees up storage space on the mobile device.

While an application is being archived, the automatic archiver program can determine whether any updates are available for the application and automatically perform the update to the archived application. The user may access the automatic archiver program to view a list of applications that have been archived, and may choose to restore the archived applications. A restored application would reflect any updates that the automatic archiver program has performed while the application was being archived.

Reference now is made in detail to the examples illustrated in the accompanying drawings and discussed below. FIG. 1 illustrates a mobile device 11. FIG. 1 illustrates elements of the mobile device 11 in functional block diagram form, at a relatively high level.

It should be appreciated that the disclosed subject matter may be implemented using any mobile computing device having computing capability and mobile communication capability, configured to use those capabilities to conduct operations such as, for example, archiving, updating or restoring mobile device applications, as discussed herein. In the example of FIG. 1, the mobile device 11 is in the form of a smart phone type mobile handset including a touch screen display. Examples of touch screen type mobile devices that may be used to implement mobile device 11 may include, but are not limited to, a smart phone, personal digital assistant (PDA), tablet computer or other portable device with mobile communication capability. However, the structure and operation of the touch screen type mobile device 11 is provided by way of example; and the subject technology as described herein is not intended to be limited thereto. For purposes of this discussion, FIG. 1 provides a block diagram illustration of the exemplary mobile device 11 having a touch screen display for displaying content and receiving user input as or as part of the user interface.

Although the operations that are the focus of discussions here will utilize data communications, a typical mobile device such as the exemplary smart phone 11, will also support voice communications. Hence, in the example shown in FIG. 1, mobile device 11 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications. The vocoder, speaker and microphone may also be used as elements of the user interface during other operations of the device, including some types of data communications.

Also, as shown in FIG. 1, the mobile device 11 includes at least one digital transceiver (XCVR) 108, for digital wireless communications via a wide area wireless mobile communication network, although the mobile device 11 may include additional digital or analog transceivers (not shown). The transceiver 108 conforms to one or more of the various digital wireless communication standards utilized by modern mobile networks. Examples of such transceivers include, but are not limited to transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." In an example, transceiver 108 provides two-way wireless communication of information including, digitized audio signals, still image and/or video signals, web page information for display as well as web related inputs, and various types of mobile message communications to/from the device.

Several of these types of communications through the transceiver and a network, as discussed later, will relate to archiving, updating or restoring mobile device applications, for example, in an implementation in which an archived application is moved from the device to a cloud-based storage system. Communications related to archiving, updating or restoring mobile device applications, for example, will often utilize Internet Protocol (IP) packet data transport utilizing the digital wireless transceiver (XCVR) 108 and over the air communications to and from base stations of the serving mobile network. Such communications may include specific mobile device application related data as may include related text, image, video and/or audio information.

Transceiver 108 also sends and receives a variety of signaling messages in support of various voice and data services provided by a network of a wireless service provider, to a user of mobile device 11 via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS) and/or multimedia messaging service (MMS). Although data communications involving mobile device application related data typically utilize IP data transport, such data communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 1, for packet data communications, the exemplary device 11 also includes a WiFi transceiver 110 and associated antenna 111. Although WiFi is used here as the example, the transceiver 110 may take the form of any available two-way wireless local area network transceiver of a type that is compatible with one or more standard protocols of communication implemented in wireless local area networks, such as one of the WiFi standards under IEEE 802.11 and/or WiMAX. The transceiver 110, for example, may provide two-way data transport for wireless communication with a wireless access point in a residence or enterprise that the user frequents or with any available hotspot offered in a public venue. Although communicating through a different network or networks, the transceiver 110 supports various types of data communications similar to the packet data communications supported via the mobile network transceiver 108, including communications that may relate to archiving, updating or restoring mobile device applications.

WiFi, as in the illustrated example, has been widely adopted for wireless local area network communications, e.g. currently over distances of up to about 100 meters or so. Although this range is somewhat shorter than that available from mobile networks via the transceiver 108, the wireless local area network communications typically incur no or lower data usage charges than the communications via the transceiver 108 using the mobile network.

Mobile device 11 further includes a microprocessor (or "processor") 112, which serves as a programmable controller for mobile device 11 by configuring mobile device 11 to perform various operations, for example, in accordance with instructions or programming executable by processor 112. Such operations may include, for example, various general operations of mobile device 110 as well as operations implemented by execution of various applications that have been installed on the mobile device 11. For purposes of the present discussion, the mobile device operations implemented by processor execution of appropriate programming also include operations related to archiving, updating or restoring mobile device applications and related operations as described herein.

A flash memory 114 is used to store, for example, programming or instructions such as the automatic archiver program, for execution by the processor 112. Depending on the type of device, the mobile device 11 will store and run an operating system through which the mobile device applications may be run on the device. Examples of operating systems include Android, Apple iOS (I-Phone or iPad devices), Windows Mobile, RIM BlackBerry operating system, or the like. The programming in the flash memory will also include one or more application programs configured for execution on the processor 112 via or in cooperation with the specific operating system. Flash memory 114 may also be used to store mobile configuration settings for different mobile device applications or services executable at mobile device 11 (using processor 112). Mobile device 11 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming for the processor, which configure the mobile device 11, include an automatic archiver program, as described herein. Program aspects of the technology may be thought of as "products" or "articles of manufacture" typically in the form of executable code or process instructions and/or associated data, e.g. for the automatic archiver program, that is stored on or embodied in a type of machine or processor readable medium.

A mobile device under consideration here may include a variety of different types of user interface elements. For discussion purposes, in the smart phone example shown in FIG. 1, the user interface elements of mobile device 11 include a touch screen display 120 (also referred to herein as "touch screen 120" or "display 120"). For output purposes, the touch screen 120 will include a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 11 and keys 130 may correspond to the physical keys of such a keyboard. Alternatively, keys 130 (and keyboard) of mobile device 11 may be implemented as "soft keys" of a virtual keyboard graphically represented in an appropriate arrangement via touch screen display 120. The soft keys presented on the touch screen display 120 may allow the user of mobile device 11 to invoke the same user interface functions as with the physical hardware keys. In some implementations, the microphone 102 and speaker 104 may be used as additional user interface elements, for audio input and output, including with respect to some functions related to archiving, updating or restoring mobile device applications, as described herein.

For output, touch screen display 120 is used to present information (e.g., text, video, graphics or other visible content) to the user of mobile device 11. Processor 112 controls visible display output on the LCD or other display element of the touch screen display 120 via a display driver 124, to present the various visible outputs to the device user. For example, the automatic archiver program may cause the processor 112 to operate the driver 124 to cause screen 120 to display visible multimedia information about a mobile device application the is suggested for archiving or an archived application that the user may chose to restore.

In general, touch screen display 120 and touch sensors 122 (and one or more keys 130, if included) are used to provide the textual and graphical user interface for the mobile device 11. In an example, touch screen display 120 provides viewable content to the user at mobile device 11. Touch screen display 120 also enables the user to interact directly with the viewable content provided in the content display area, typically by touching the surface of the screen with a finger or an implement such as a stylus.

In some implementations, touch screen display 120 is a capacitive touch screen display and touch sensors 122 are independent capacitors arranged as a grid and disposed at various points throughout a transparent conductive material (e.g., indium tin oxide) that is layered onto a hard surface composed of insulating material (e.g., glass). As another example, the respective locations of touch sensors 122 (e.g., capacitors) may correspond to different intersection points of a matrix of rows and columns of the layered conductive material. Alternatively, touch sensors 122 may include a grid of capacitive electrodes formed of one or more layers of transparent conductive material etched onto a sheet of hard insulating material, as described above. However, it should be noted that touch screen display 120 is not limited to either of the above-described implementations. Accordingly, touch screen display 120 may be implemented using any of various conventional or other techniques based on, for example, the type of capacitive touch screen technology desired for a particular implementation. User input includes touch of the display device with the user's finger, stylus or similar type of peripheral device used for user input with a touch screen. When current is applied to touch screen display 120, user input can be detected by touch sensors 122 based on a measurable change (e.g., reduction) in mutual capacitance based on measurable changes in capacitance and voltage at one or more individual sensor locations corresponding to the physical point(s) of contact of the user's finger(s) or conductive stylus with respect to touch screen display 120.

As shown in FIG. 1, mobile device 11 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The information provided by sense circuit 128 may include, for example, a series of different locations of touch points/positions detected across the content display area of touch screen display 120 over a predetermined period of time. The location and time information for a series of continuous touch points/positions can be used by processor 112 to track the movement of the user's finger(s) (or other input device) across touch screen display 120. This information also may be used to track various parameters including, but not limited to, the direction and speed of finger movement based on changes between the different touch positions over time. The information tracked by sense circuit 128 is used by processor 112 to detect various points of touching as well as different types of touch gestures, for enabling the processor and thus the device 11 to perform operations in accordance with each touch or touch gesture, including any related to operations or the like with respect to archiving, updating or restoring mobile device applications, as described herein.

The logic implemented by the processor of the mobile device 11, in the example, by the microprocessor 112, configures the processor to control various functions as implemented by the mobile device 11. The logic for a processor may be implemented in a variety of ways, but in our example, the processor logic is implemented by programming, such as the automatic archiver program, for execution by the microprocessor 112. The programming may take a variety of forms; and depending on the general program architecture, aspects relating to operations performed by the automatic archiver program (e.g., archiving, updating or restoring mobile device applications) may be implemented in various ways. For example, the functions for archiving, updating or restoring mobile device applications could be implemented using a special module in the operating system and/or as a standalone application program. In our example, the automatic archiver program may be a standalone application having privileged access rights to the operating system.

Hence, the example includes a number of programs 140, including the operating system (OS) 142, a number of applications 144 and the automatic archiver program 146, stored in the flash memory 114 for execution by the microprocessor 112. While in this example the automatic archiver program 146 is discussed as a separate program 140, the automatic program 146 may also be part of the OS 142. An application 144 may be installed at the mobile device 11 based on install data for the application. Install data includes data and/or other types of information that is used to install, or setup, the application for initial use at the mobile device 11 before user-specific configuration or personalization is applied. The install data may itself be programming which when executed by the microprocessor 112 installs the application for use at the mobile device 11.

The execution of the automatic archiver program 146 by the microprocessor 112 enables the mobile device 11 to identify one or more mobile device applications 144 that meet one or more predetermined archiving criteria and archive the identified mobile device applications according to user input. For example, the automatic archiver program 146 may configure the processor 112 to run a background task which automatically identifies any of the number of applications 144 that satisfies one or more predetermined archiving criteria. When any of the applications 144 that satisfies the archiving criteria is identified, execution of the automatic archiver program 146 by the microprocessor 112 causes the mobile device 11 to prompt the user, via a user interface for application archive operations, as to whether or not to archive the identified application. Upon user input responsive to the prompt, e.g. confirming an intent or desire to archive the application, the automatic archiver program 146 configures the microprocessor 112 to modify the status of the mobile device application so as to archive the application.

As another example, after the applications 144 that satisfy one or more predetermined archiving criteria are identified as in the example above, the automatic archiver program 146 may configure the microprocessor 112 to automatically archive the identified applications. After archiving the identified applications, the execution of the automatic archiver program 146 by the processor 112 further causes the mobile device 11 to notify the user that the identified applications have been archived, and prompt the user whether or not to restore the archived applications. The notification and prompting the user of the automatically archived application may be made by providing a user interface (e.g., a pop up notification window) displaying the list of archived applications and including links or buttons through which the user may provide input for restoring the archived applications. Emails or text messages may also be used for the notification and prompting. For example, execution of the automatic archiver program 146 by the processor 112 causes the mobile device 11 to send an email or a text message which includes a list of applications 144 that have been automatically archived and a link to a user interface through which the user may provide input for restoring the archived applications.

The flash memory 114 also stores an application log 150. The application log 150 includes information related to managing the applications 144. For example, the application log 150 stores information on the origin of an application (e.g., where the install data for the application was downloaded from or whether the application was pre-installed at the mobile device 11), how the application was installed, how the application will be updated (e.g., whether the application is updated automatically, or updated upon user input), when the application was opened by the user and when the application was last modified. The application log is created and is kept updated by the OS 142 as part of managing the applications 144.

The structure and operation of the mobile device 11, as outlined above, were described to by way of example, only.

Figure 2:
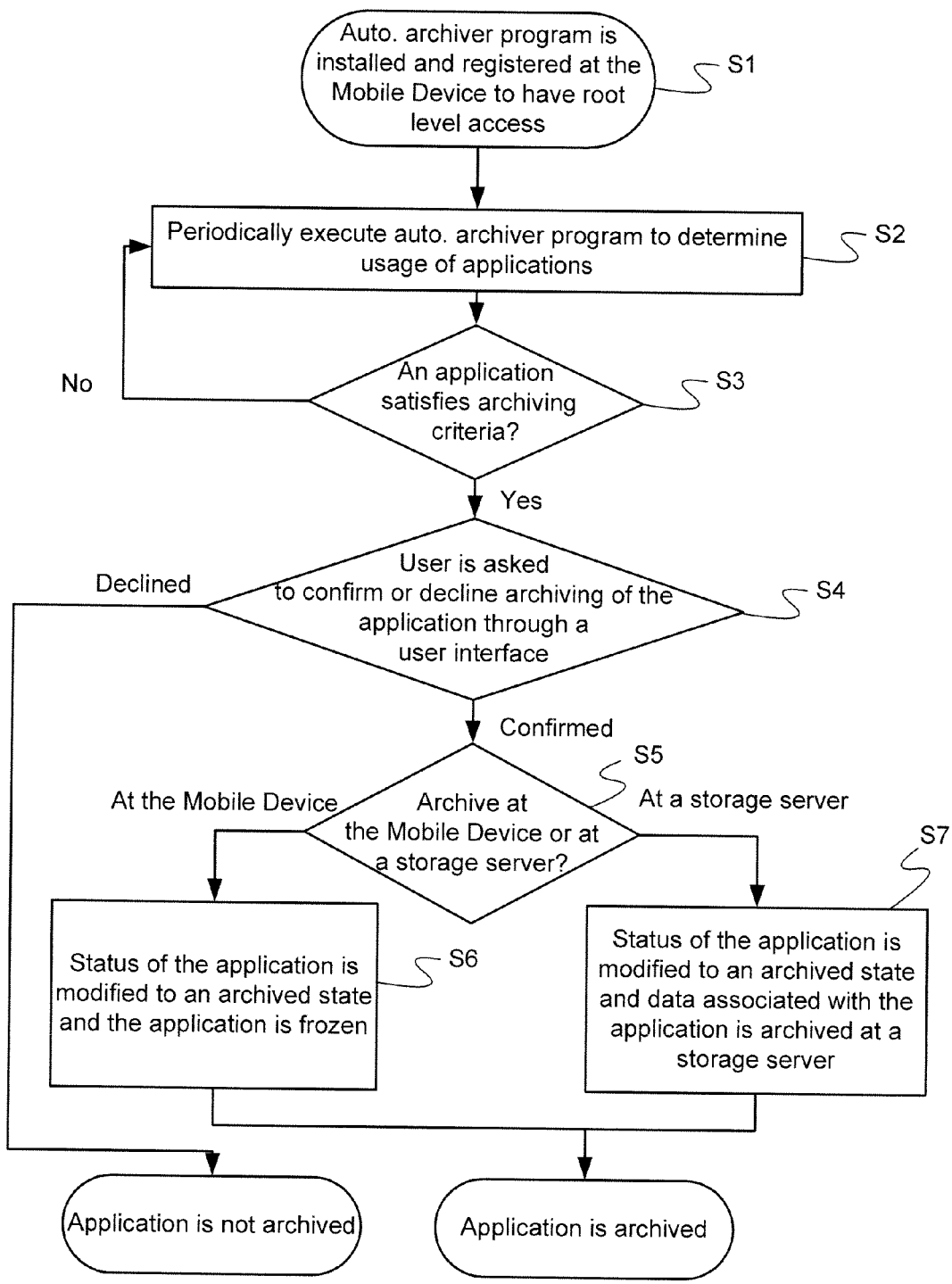
FIG. 2 is a flow chart useful in understanding a process for archiving mobile device applications.

For discussion of the process flow of FIG. 2, we will assume that the automatic archiver program 146 is installed and registered within the mobile device 11 so as to have root level access to the OS 142 of the mobile device 11 (step S1). A user or programming having root level access has the highest authority or privilege with regards to using or interacting with an operating system. For example, as a result of having root level access to the OS 142 of the mobile device 11, the automatic archiver program 146 is not prevented by the OS 142 from accessing, modifying or deleting private data that are associated with the applications 144 that are stored in the memory 114. Private data that are associated with the applications 144 may be, for example, data representing user-specific changes or customizations made to the application, or other types of data that are generated in connection with the user's use of the application. Specifically, when an application is installed at the mobile device 11 using install data for the application, the application may not contain user specific customizations. However, once the application is installed at the mobile device 11, the user may make user-specific customization to the application using, for example, a configuration menu. Information on such user-specific customization may be stored as private data for the application. The root level accessibility for the automatic archiver program 146 allows that program 146 to manipulate private data for an application, for example, as part of an archiving operation and/or a restoration for the particular application. While this example assumes that the automatic archiver program 146 has root level access to the OS 142, other levels or types of access to the OS 142 that gives the automatic archiver program 146 permission to access, modify, or delete private data may also be used.

At step S2, the automatic archiver program 146 is periodically executed to determine usage of the number of applications 144 by the user. Specifically, the automatic archiver program 146 executes a background task, for example, every one week, to determine the usage of the applications 144. The usage of the applications 144 may be determined based on the application log 150. For applications 144 in general, the OS 142 may prevent access to the application log 150. However, the automatic archiver program 146 has access to the application log 150 because it has root level access to the OS 142. While in this example, the automatic archiver program 146 determines the usage of the applications every week, the period according to which the automatic archiver program 146 determines the usage of the application 144 may vary according to various factors, such as, for example, previously determined usage of the applications 144, profile of the user, location of the mobile device 11, or time of the year.

At step S3, the automatic archiver program 146 determines whether usage of an application 144 satisfies one or more archiving criteria. For example, the automatic archiver program 146 may determine that usage of one of the number of applications 144 satisfies the archiving criteria if the application has not been opened by the user for a predetermined period of time indicating that, at least from a user perspective, the application has gone unused for the particular period of time. Other archiving criteria may also be used. For example, the predetermined period of time for satisfying the archiving criteria may be different for different applications, and/or for different application types and/or for applications of different levels of importance. As just one example, if an application is intended to be used infrequently the threshold time for satisfying the archiving criteria is longer than that of an application that is intended to be used more frequently. While in this example, the period of time for satisfying the archiving criteria is predetermined, the period may also vary according to various factors, such as, for example, previously determined usage of the applications 144, profile of the user, location of the mobile device 11, or time of the year.

The status of the mobile device 11 may also be considered when determining whether the archiving criteria is satisfied. For example, when the processing resources are being used by various background tasks for more than a predetermined amount and/or when free storage space at the flash memory 114 falls below a predetermined amount, the threshold time for determining satisfaction of the archiving criteria may be lowered such that more applications are determined as satisfying the archiving criteria. In another example, the archiving criteria may be predetermined such that, when the processing resources are being used by various background tasks for more than a predetermined amount and/or when free storage space at the flash memory 114 falls below a predetermined amount, a number (e.g., two or three) of the least used applications may be determined for suggestion for archiving.

As another example, in determining whether the archiving criteria is satisfied, measures may be provided to determine whether an opening of an application by the user was a mistake and to ignore such openings. Specifically, expected-use lengths of time for different applications may be stored in the memory 114, the expected-use times representing typical use times for the different applications. The automatic archiver program 146 may determine the expected-use times by executing a background task which, when the user opens an application, monitors the time until the application is closed. A number of such actual use times may be averaged to determine the expected-use time for the application. The expected-use time may also be provided by the developer of the applications 144, and stored in the flash memory 114 when the application is installed at the mobile device 11. In such case where the expected-use time is provided by the developer, the expected-use times may be updated as part of the regular updating process for the application.

The length of typical use of an application by the user may vary depending on the type of application. For example, a weather-checking application may be expected to be used for relatively a short period of time, whereas a game application may be expected to be used for a longer period of time, once the application has been opened. Based on such expected-use times, the automatic archiver program 146 may track the length of time the application was used and ignore a user's opening of an application, if the application was opened and used for less than the expected-use time for the application. This time of use may be stored in the memory 114 or discarded after the determination is made whether to count the application opening.

The archiving criteria may also be determined based on user input. For example, a user interface may be provided through which the user may select an archiving criteria from a list of options such as, for example, different lengths of unused time for suggesting applications for archiving. The user interface may also provide the user options to select different archiving criteria for different applications. A list of applications that are installed at the mobile device 11 may be displayed, and the user interface may provide a list of archiving criteria options for user selection for each of the displayed applications.

If the automatic archiver program determines at step S3 that usage of one of the applications 144 satisfies the archiving criteria, the user is prompted via the user interface provided by the automatic archiver program 146 to confirm or decline archiving of the application (step S4). The user may be prompted confirm or decline archiving of the application through a user interface displaying information regarding the application such as, for example, name, size, last used date, and frequency of use. The prompt may display all applications 144 that satisfy the archiving criteria, such that the user may confirm or decline archiving each application. The user interface may also allow the user to select between the available archiving modes (e.g., archiving at the mobile device 11, or at a storage server) for the applications. The user interface may further display descriptions of the available archiving modes.

In this example the user is prompted to confirm or decline archiving the applications in response to determining that one or more of the applications 144 satisfies the archiving criteria. However, the prompting of the user may also be made periodically independent of when the applications 144 are determined for satisfying the archiving criteria. Also, the user may also be prompted to confirm or decline archiving of the application in response to device events such as, for example, when free storage space in the flash memory 114 falls below a predetermined threshold, or when the user attempts to download and install an application that will reduce the free flash memory space below a predetermined threshold.

If the user declines archiving of an application, the application will not be archived. If the user confirms archiving of the application, the automatic archiver program 146 also determines the mode of archiving, e.g., whether to archive the application at the mobile device 11 or at a storage server (step S5). When the application is archived at the mobile device, the application is not removed from the flash memory 114 of the mobile device 11. However, the application becomes inaccessible and invisible to the OS 142 and/or the user. Therefore, no background tasks associated with application are run by the OS 142, thereby increasing available processing resources. Also, because the application becomes invisible to the user, the user's list of available application becomes less cluttered, allowing the user to concentrate on non-archived applications. When the application is archived at a network or cloud-based storage server, the application is removed from the flash memory 114, and information for restoring the application later on is stored at the (or a different) storage server. Therefore, in addition to increasing available processing resources and decluttering the user's list of available applications, the available storage space at the flash memory 114 is also increased.

The determination of the mode of archiving may be made based on user input. For example, a user interface may be provided such that the user may, in advance of being prompted to confirm or decline archiving of applications, select whether to archive applications confirmed for archiving at the mobile device 11 or at a storage server. The user may also be able to indicate different archiving modes for different applications 144. The automatic archiver program 146 may also prompt the user for the mode of archiving when the user is prompted to confirm or decline archiving of the one of applications 144 for archiving at step S4. In addition, the automatic archiver program 146 may also automatically determine the mode of archiving based on the status of the mobile device 11, or the size of the application confirmed for archiving. For example, if free storage space at the flash memory 114 is less than a predetermined amount, the mode of archiving may be automatically determined as archiving at a storage server. If the size of the application confirmed for archiving is greater than a predetermined size, the mode of archiving may also be automatically determined as archiving at the storage server.

If the application confirmed for archiving is to be archived at the mobile device 11, the status of the application is modified to an archived state, and the application confirmed for archiving is "frozen" (step S6). The status of the application is modified to an archived state by removing the application from a list of applications accessible by the OS 142, and adding the application to the list of archived applications. The list of applications accessible by the OS 142 may be stored in the flash memory 114 and is managed by the OS 142. The automatic archiver program 146 may access and modify this list of applications accessible by the OS 142 because it has root level access to the OS 142. As one example, the list of applications accessible by the OS 142 may be stored in the application log 150. The list of archived application is managed by the automatic archiver program 146, and may also be stored in the flash memory 114. Therefore, while data related to the application for archiving (e.g., install data and the private data) remains in the flash memory 114, the application is frozen such that the data are no longer accessible or visible by the OS 142. Various techniques may be used for freezing applications confirmed for archiving. For example, an application is frozen by removing the application from a list of applications that are accessible by the OS 142. The application is also removed from the list of applications that the user may open. The archived application is added to a list of archived application maintained by the automatic archiver program 146 such that the archived application may be later accessed by the automatic archiver program 146 to perform updates or to restore the archived application.

Because the OS 142 no longer has access to the archived application, any background tasks associated with the archived application that would have been automatically executed without user input, are no longer executed. Thus, the OS 142 has more processing resources to redistribute to other tasks that would otherwise have been reserved for executing the background tasks for the archived application. As discussed above, the user also no longer has access to the archived application, because the archived application is removed from the list of applications that the user may open. For example, an icon or link to the archived application that the user may have placed at a home screen of the mobile device 11 is removed. Therefore, the user's home screen will be less cluttered.

If the application confirmed for archiving is to be archived at a storage server in or connected to a network, the status of the application confirmed for archiving is modified to an archived state, and data associated with the application is archived at a storage server (step S7). As with archiving applications at the mobile device 11, the status of the application is modified to an archived state by removing the application from the list of applications accessible by the OS 142 (managed by the OS 142), and adding the application to the list of archived applications (managed by the automatic archiver program 146). When archiving the application at the storage server, private data associated with the application is copied onto the storage server. The automatic archiver program 146 also determines whether install data for the application confirmed for archiving is available from a separate server. If the install data is available from a separate server, a link to the install data is copied and stored at the storage server, rather than storing the entire install data. For example, if the application had been purchased from an application store, the install data will be available from the application store, and the link to the install data at the application store is copied to the storage server.

However, if the automatic archiver program 146 determines that install data is not available from a separate server, the install data is also copied onto the storage server. For example, the application confirmed for archiving may be an application that is pre-loaded onto the mobile device 11 which is not available for purchase separately. As another example, the user may have previously purchased the application confirmed for archiving from an application store, but the application may be no longer offered for purchase by any application stores.

After the private data, and the link to the install data or the actual install data is copied onto the storage server for archiving, the archived application is removed from the flash memory 114, freeing up storage space for other data. Since the archived application is removed from the flash memory 114, the OS 142 no longer has access to the archived application, freeing up processing resources for use by other operations that would otherwise have been reserved for performing background tasks associated with the archived application.

During the time in which the archived application is in the archived state, the automatic archiver program 146 determines whether updates are available for the archived application, and automatically applies the update to the archived application. For example, the automatic archiver program 146 may monitor the application log or otherwise intercept any relevant update notifications that would otherwise have been sent to the particular application if the application were not archived, to determine whether an update is available for the archived application. If an update is available, the automatic archiver program 146 receives the update, and automatically applies the update to the archived application. In the case where the application is archived at a storage server, a link to the update may be stored at the storage server such that the automatic archiver program 146 may automatically apply the update when the application is restored. The automatic archiver program 146 may also provide a user interface through which the user may indicate whether or not to automatically apply updates to the archived application and/or whether restoration is desired after applying the update. In one example, if a game application has been archived as the user has not played the game recently, the update may provide additional features/levels and thus the user may be interested in playing again. In this case, the update is either applied automatically or manually by the user after being notified of the update and perhaps what the update contains so that the user is able to make an informed decision on whether or not to restore the updated game.

Figure 3:
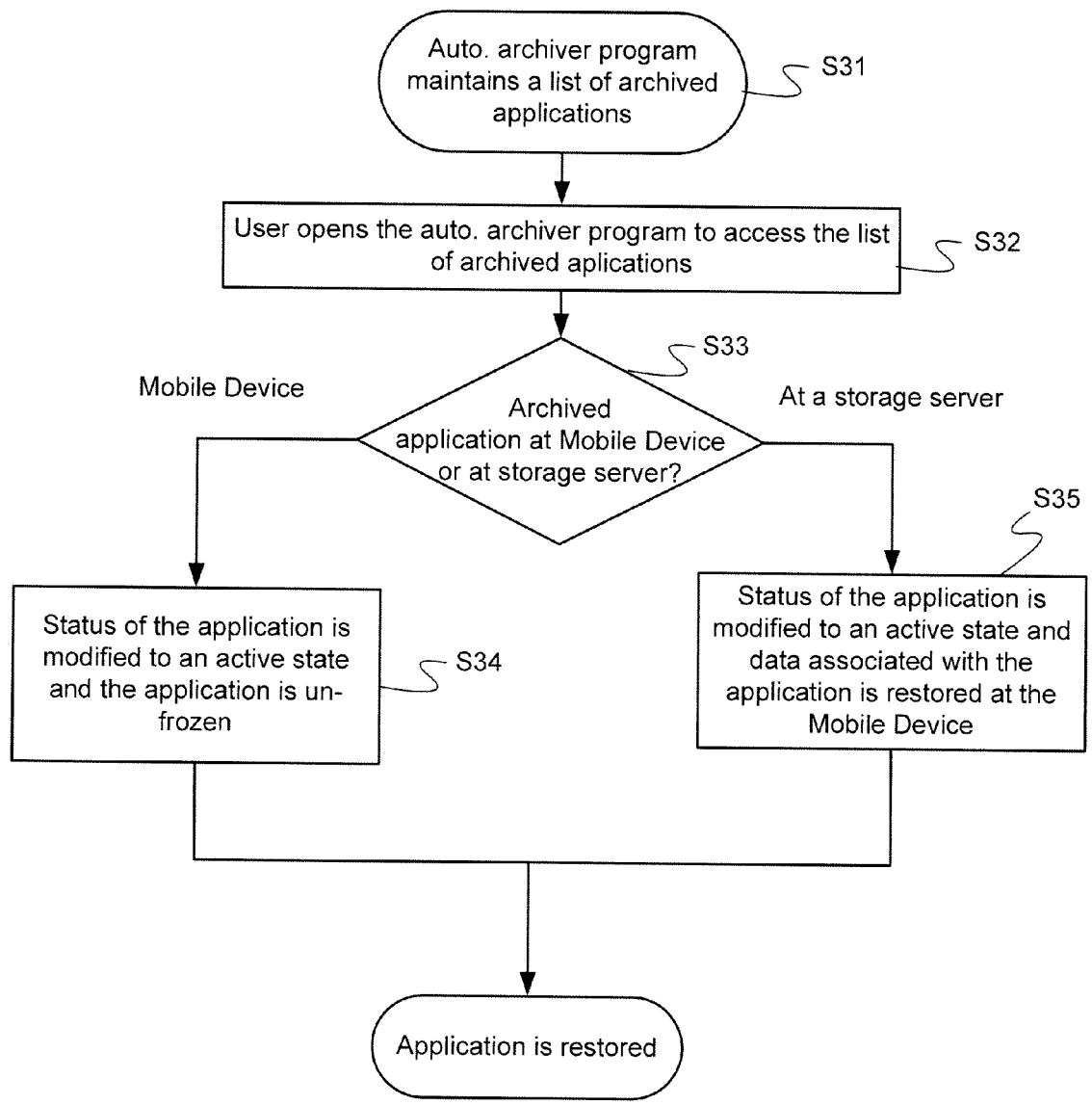
FIG. 3 is a flow chart useful in understanding a restoring process for archived mobile device applications.

FIG. 3 is a flow chart useful in understanding a process for restoring archived applications back onto the mobile device 11.

As discussed above, the automatic archiver program 146 maintains a list of archived applications (step S31). The user can open the automatic archiver program 146 to access the list of archived applications (step S32). Through a user interface provided by the automatic archiver program 146, the user may select an archived application that the user wishes to restore onto the mobile device 11. The user interface may also display information regarding the archived application such as, for example, name, size, last used date, frequency of use, the time at which the application was archived and whether any updates were applied and/or became available after the application has been archived. The user interface may further display the available storage space at the flash memory 114, and display a warning if the size of an archived application is larger than the available flash memory space. Upon receiving a user selection on an archived application to restore, the automatic archiver program 146 determines the mode of archiving for the archived application, e.g., whether the application was archived at the mobile device 11 or at a storage server (step S33).

If the archived application selected for restoring was archived at the mobile device 11, the automatic archiver program 146 modifies the status of the archived application back to an active state, such that the OS 142 of the mobile device 11 again has access to the archived application (step S34). The status of the archived application is modified to an active state by adding the archived application to the list of applications accessible by the OS 142, and removing the application from the list of archived applications. Data associated with the archived application (e.g., install data and private data) is un-frozen such that the data is both visible and accessible to the user. Various techniques may be used for un-freezing the archived application. For example, an archived application is un-frozen by restoring the application in the list of applications that may are accessible by the OS 142, and adding the archived application back into the list of applications that the user may open. The archived application is also removed from the list of archived applications maintained by the automatic archiver program 146. If the user had indicated to automatically apply updates to the archived application, the restored application will be in the most up-to-date state, since the automatic archiver program 146 will have applied the updates while the application was being archived, as discussed above.

If the archived application selected for restoring was archived at a storage server, the automatic archiver program 146 modifies the status of the archived application to an active state, and data associated with the archived application is copied from the storage server to the flash memory 114 of the mobile device 11 (step S35). As with step S34, the status of the archived application is modified to an active state by adding the archived application to the list of applications accessible by the OS 142, and removing the application from the list of archived applications. If the entire install data is archived at the storage server along with the private data, the install data and the private data is copied onto the flash memory 114, such that the application is restored exactly as it was before archiving. If the user had indicated to automatically update the archived application while in the archived state, the restored application will have all the updates already applied.

If a link to the install data was archived at the storage server instead of the actual install data, the automatic archiver program 146 obtains the install data based on the archived link, and restores the archived application at the mobile device 11 based on the obtained install data and the private data that was archived at the storage server. For example, the automatic archiver program 146 may download and install the archived application at the mobile device 11 using the link to the install data, and applies the private data that was archived at the storage server to the installed application, so as to restore the application to the same state as it was just before archiving. Any updates that became available while the archived application was being archived are also automatically applied after the application is installed at the mobile device 11.

The user may also be prompted to restore one or more archived applications based on satisfying one or more predetermined criteria or in response to various device events at the mobile device 11. For example, the automatic archiver program 146 may be programmed by a developer of an archived application to suggest to the user an archived application if the application has been archived for more than a predetermined length of time, or in response to a message (e.g., message to the user suggesting to restore the archived application) communicated to the mobile device 11 by the developer. As another example, the automatic archiver program 146 may prompt the user to restore an application that helps prolong battery life that had been archived, if battery levels of the mobile device 11 are determined to be decreasing at a rate greater than a predetermined threshold.

The automatic archiver program 146 may also allow the user to archive applications on the mobile device 11 onto a storage server and restore the archived applications at a new mobile device. For example, if the user is switching his or her mobile device from the mobile device 11 to a newer/recently obtained mobile device, the user may utilize the automatic archiver program 146 to restore the applications that were on the mobile device 11 on the new mobile device. In this example it will be assumed that the automatic archiver program 146 is installed at both the mobile device 11 and the new mobile device. The automatic archiver program installed at the new mobile device may determine whether the archived applications are compatible with the new mobile device. If an archived application is determined to be incompatible with the new mobile device, a notification may be displayed to the user notifying that the application cannot be installed at the new mobile device, and the incompatible application will not be restored on the new mobile device.

Specifically, the automatic archiver program 146 at the mobile device 11 may provide a user interface through which user may select the applications that he or she wishes to restore at the new mobile device. Upon receiving the user input for the applications for restoring at the new mobile device, the automatic archiver program 146 performs the same operations discussed above with respect to FIG. 2 as they relate to archiving an application at a storage server (e.g., step S7), to archive the applications at the storage server. At the new mobile device, the user may be provided with a user interface via the automatic archiver program installed at the new mobile device for restoring the archived applications at the new mobile device.

Upon receiving user input for restoring the archived applications at the new mobile device, the automatic archiver program at the new mobile device performs the operations consistent with those discussed above with respect to FIG. 3 as they relate to restoring archived applications from a storage server (e.g., step S35), to restore the archived applications at the new mobile device.

Figure 4B:
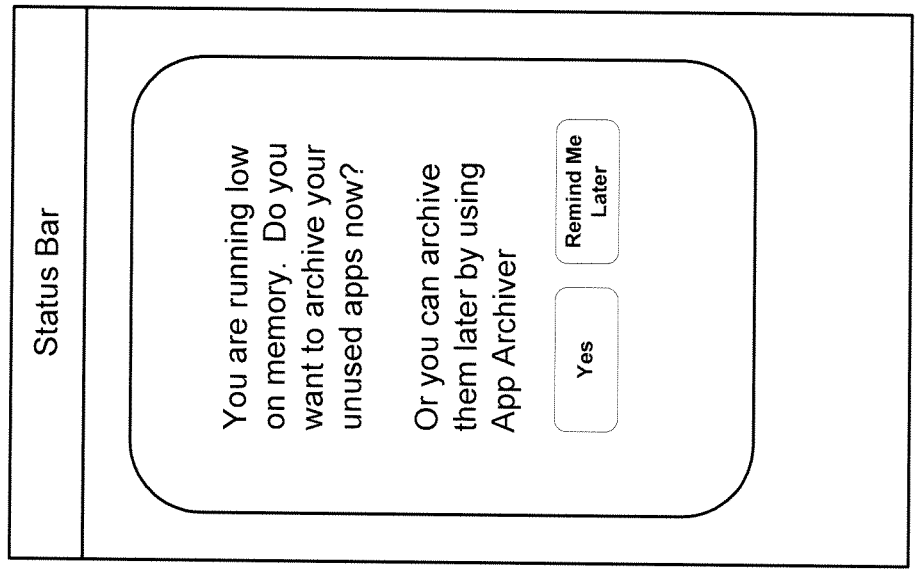
FIGS. 4A-F illustrate exemplary user interfaces that an automatic archiver program may provide as part of a process for archiving mobile device applications and restoring archived mobile device applications.
Figure 4A:
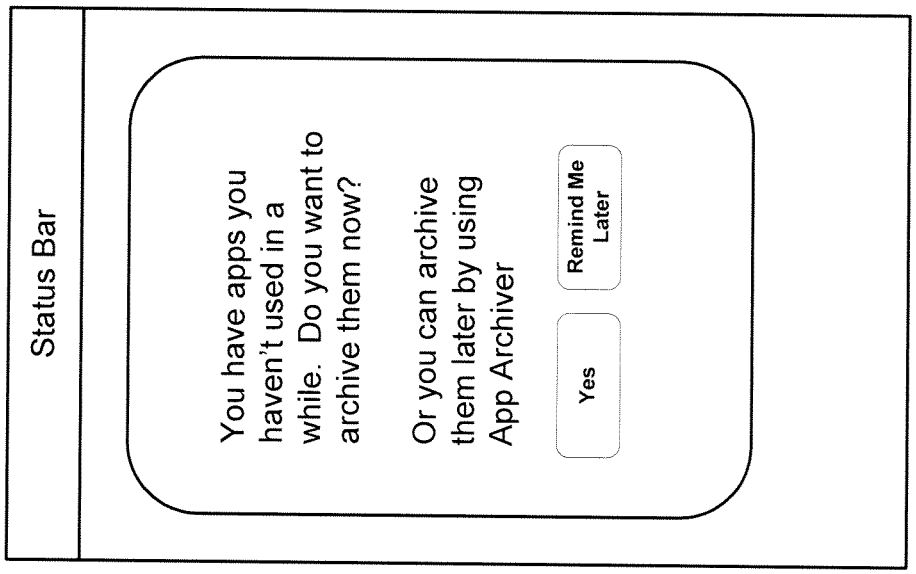

FIGS. 4A-F illustrate exemplary user interfaces that the automatic archiver program 146 may provide as part of a process for archiving mobile device applications and restoring archived mobile device applications. FIGS. 4A and 4B illustrate examples of user interfaces provided by the automatic archiver program 146, prompting a user of the mobile device 11 to confirm or decline archiving of applications that are suggested for archiving. Referring to FIG. 4A, the drawing shows that the user is prompted to archive suggested applications that are determined to have been not used for a predetermined period of time so as to satisfy the archiving criteria. In this example, the user may tap on "Yes" to confirm archiving the suggested applications, or tap on "Remind Me Later" to decline archiving. Referring to FIG. 4B, the drawing shows that the user is prompted to archive suggested applications in response to a device event (e.g., memory running low).

Figure 4D:
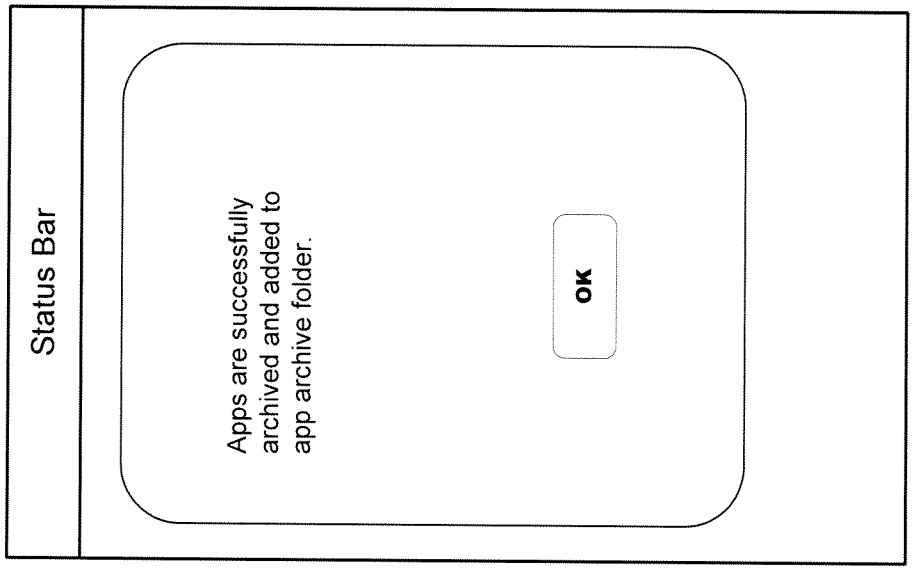
Figure 4C:
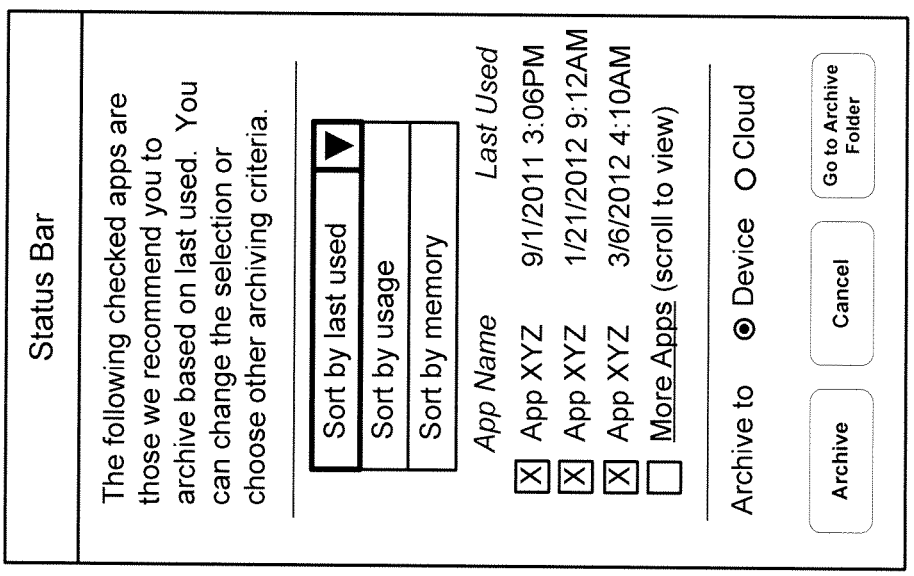

After tapping on "Yes" on either of the user interfaces shown in FIG. 4A or 4B, the automatic archiver program 146 may display the user interface as shown in FIG. 4C, which allows the user to view the applications that are suggested for archiving, individually confirm or decline archiving of the suggested applications, and select the mode of archiving (e.g., at the device or on a cloud-based storage server). In this example, the user interface also allows the user to sort the suggested application according to different sorting criteria (e.g., last used date, usage and size of application). The user may select the desired applications for archiving, and tap on "Archive" to archive the selected applications. FIG. 4D shows an exemplary user interface notifying that selected applications have been successfully archived.

Figure 4F:
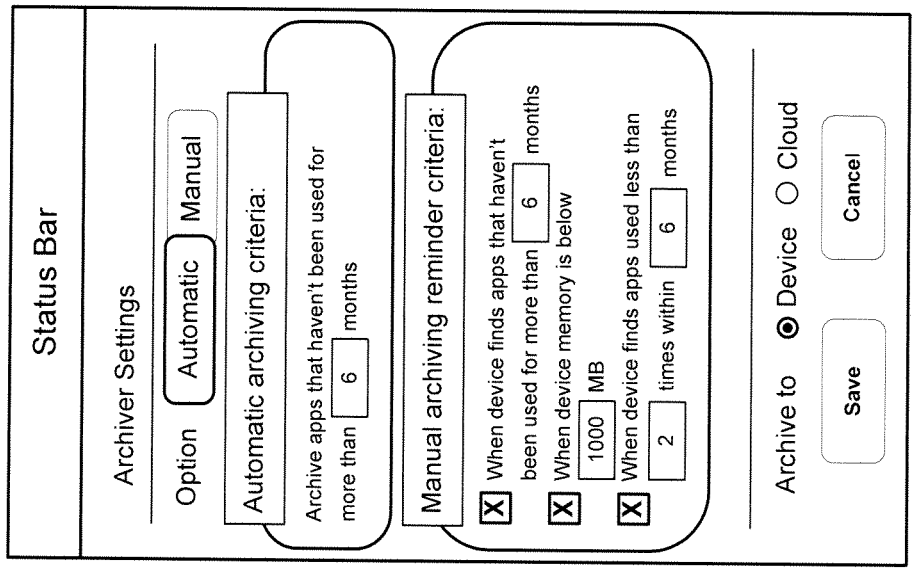
Figure 4E:
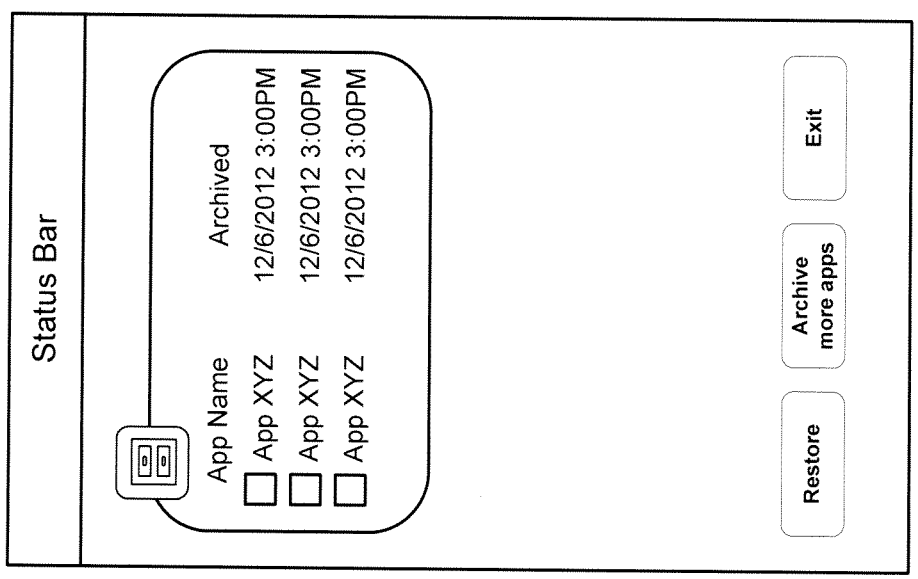

FIG. 4E shows an exemplary user interface for restoring archived applications. In this example, the drawing shows a list of archived applications and the date each application is archived. The user may select desired archived applications to restore, and tap on "Restore" to restore the selected applications. FIG. 4F shows an exemplary user interface for receiving user input for various settings related to the automatic archiver program. In this example, the drawing shows that the user may select between whether to archive suggested applications automatically without user input, or to prompt the user to manually confirm or decline suggested applications which meet the archiving criteria. The drawing also shows that the user may provide the archiving criteria through the user interface.

Figure 5:
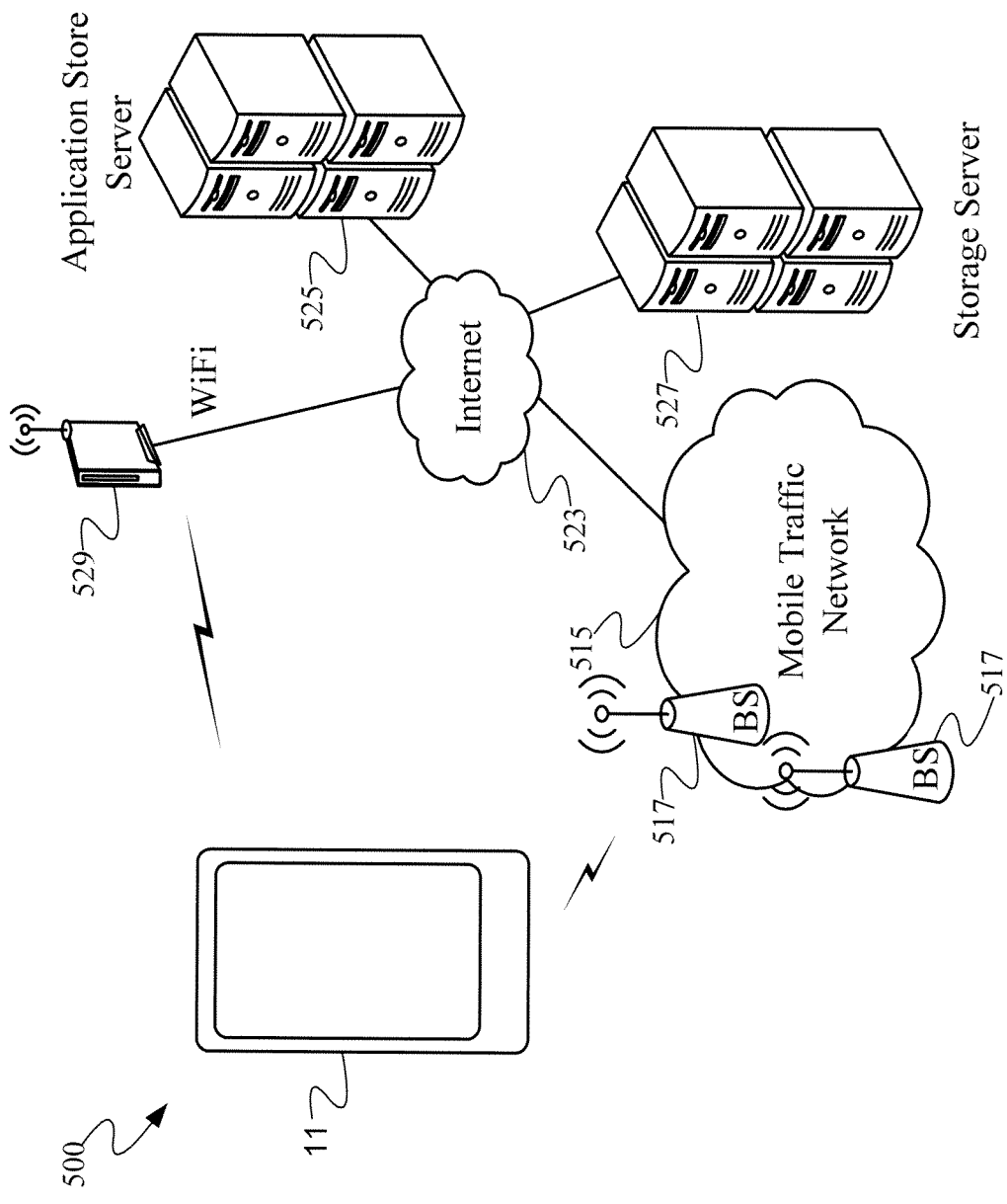
FIG. 5 is a high-level functional block diagram of an example of a system of networks/devices that provide various communications for mobile devices, for example, for an operation or other communication that may archive an application that satisfies one or more predetermined criteria.

FIG. 5 illustrates a system 500 offering a variety of mobile communication services, including communications for archiving, updating or restoring mobile device applications. Communications related to archiving, updating or restoring may involve communication with other equipment and/or mobile carrier provided network transport or wireless local area network transport and the Internet to communicate related information to and from the mobile device 11.

The example shows simply one mobile device 11 as well as a mobile communication network 515. The mobile device 11 is a smart phone type device, in this case that utilizes a touch screen for the user interface, including for any communication related to archiving, updating or restoring mobile device applications, of the type discussed above relative to FIG. 1. The network 515 provides mobile wireless communications services to mobile devices including device 11, for example, via a number of base stations (BSs) 517 of the network 515. The present techniques may be implemented in any of a variety of available mobile networks 515 and/or on any type of mobile device compatible with such a network 515 under consideration here, and the drawing shows only a very simplified example of a few relevant elements of the network 515 for purposes of discussion here. Although only the one user's device 11 is shown, the network 515 will provide various communications for many other similar users and their various devices as well as for mobile devices/users that do not participate in the communications for archiving, updating or restoring mobile device applications under consideration here.

The wireless mobile communication network 515 may be implemented as a network conforming to any of the applicable standards for public mobile wireless communications, examples of which include, but are not limited to, Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G."

Many of the mobile devices served by network 515, including device 11 in our example, are capable of voice telephone communications through the network 515, various types of mobile messaging service communication and mobile data communications. Although the messaging service transport could be used, the exemplary device 11 will typically utilize data communications through the particular type of network 515 for the communications related to archiving, updating or restoring mobile device applications; and a user of such a device 11 typically will have subscribed to data service through the network 515.

In general, the network 515 offers users of the mobile devices such as device 11 (and other mobile devices not shown) IP data transport for a variety of data services, e.g. via the Internet 523, such as downloads, web browsing, email, etc. Such communications may be with other mobile devices, various other types of user terminals and/or computers configured as servers. For the communications related to archiving, updating or restoring mobile device applications, the drawing shows two examples of servers, connected in the example via the Internet 523.

The first server 525 is that of an application store server. In a process example like that of FIG. 2 described above, examples of services that might utilize such a server 525 include a mobile device applications store provided by the operator of the network 515, mobile device application stores provided by third party service providers, etc. The mobile device 11 may receive data related to updating or restoring applications (e.g., install data for restoring an archived application if only a link to the install data is stored for archiving the application) through the network 515 and the Internet 523 from the application server 525 (FIG. 5).

The other exemplary server is a storage server 527. For example, the server 527 may be utilized by a storage service provider in provides data storage services for storing data related to applications that are archived using the automatic archiver program 146. Specifically, the mobile device 11 will communicate to the storage server 527, private data and install data/link to install data for applications that are archived using the automatic archiver program 146 as discussed above in FIG. 2 through the network 515 and the Internet 523. The storage server 527 may be multiple servers in communication with each to provide a cloud-based storage of data.

To insure that the service offered by server 525 and/or the service offered by server 527 is available on a virtually continuous uninterrupted basis for many similar users/devices, each server is typically implemented on many similar platforms on a distributed basis.

As noted in the discussion of the device 11 relative to FIG. 1 above, the device may be capable of WiFi communication as well as or instead of mobile wireless communication via a network like the illustrated carrier network 515. Hence, for discussion purposes, the drawing also shows a WiFi access point 529 connected to the Internet 523.

The WiFi access point 529 may be a hotspot in a public or commercial venue, which provides Internet access within the vicinity; or the WiFi access point 529 may be secured to provide private access in a home, an office, on a campus, or the like. The access point 529 provides WiFi enabled devices like mobile device 11 with wireless IP packet data communication, in this case, for access to the Internet 523. When available, communication related to archiving, updating or restoring mobile device applications with either of the servers 525 and 527 may utilize WiFi instead of wireless mobile communications through the network 515, for essentially the same types of actions related to archiving, updating or restoring mobile device applications.

As shown by the above discussion, functions relating to archiving, updating or restoring mobile device applications as shown in FIG. 1 may be implemented using executable programming on an appropriate mobile device and in at least some cases may involve communication with servers or the like connected for data communication via the components of a data network, such as the server 525 and/or the server 527 as shown in FIG. 5. In addition to the functions related to providing data relating to archiving, updating or restoring mobile device applications supported by the server(s) in the specific example of FIG. 5, the same or other server(s) may support downloading of original of upgrade versions of the relevant programming (e.g., automatic archiver program 146) for the mobile device 11, through a network to install the programming in the device 11. Although special purpose devices may be used for any of these server functions, such servers also may be implemented using one or more hardware platforms intended to represent a general class of data processing device commonly used to run "server" programming so as to implement the respective functions discussed above, albeit with an appropriate network connection for data communication.

Figure 6:
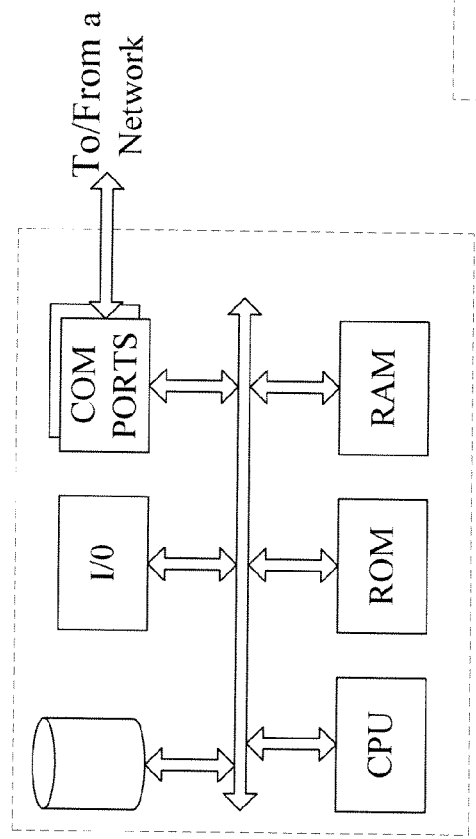
FIG. 6 is a simplified functional block diagram of a computer that may be configured as a host or server, for example, to function as the application store server or the storage server in the system of FIG. 5.
Figure 7:
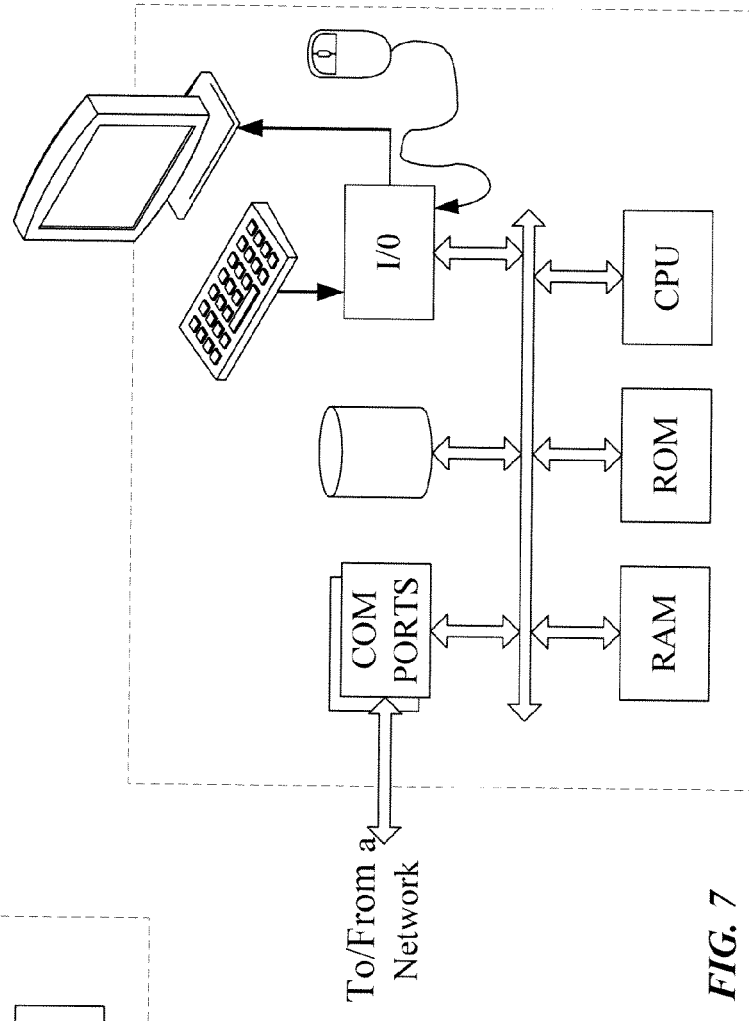
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

The software functionalities involve programming, including executable code as well as associated stored data, e.g. executable code and associated data files used for the automatic archiver program 146. The software code is executable by the microprocessor 112 or other programmable processor of the mobile device 11, although as noted, at times, such software may be stored in another computer platform and downloaded through a network for installation in the mobile device 11. Execution of such code by a processor of the mobile device 11 enables the device 11 to implement the methodology for obtaining user inputs relating to archiving, updating or restoring mobile device applications and performing the archiving, updating or restoring operations, in essentially the manner performed in the implementations discussed and illustrated herein.

Hence, aspects of the methods of archiving, updating or restoring mobile device applications and related action processing outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a merchant or an application store into the mobile terminal of the customer/user. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
a wireless transceiver configured to enable wireless data communication via a network; a processor coupled to the wireless transceiver;
a memory accessible by the processor; and
programming stored in the memory for execution by the processor, the programming including:
a plurality of applications each comprising programming and associated data; and
an automatic archiver program, wherein execution of the automatic archiver program by the processor configures the mobile device to perform functions, including functions to:
determine an expected-use time that is specific to a first application of the plurality of applications by averaging a plurality of actual uses times of the first application, wherein each actual use time is length of time between when the first application is opened and then closed on the mobile device;
in response to determining the expected-use time, track a length of use time that is time between when the first application is opened beginning at an opening time and when the first application is closed ending at a closing time;
upon determining that the tracked length of use time of the first application exceeds the expected-use time, store the opening time and the tracked length of use time for the first application in an application log in the memory;
in response to storing the opening time and the tracked length of use time in the application log, determining free storage space of the memory of the mobile device;
when the determined free storage space of the memory of the mobile device falls below a predetermined free space amount, adjust predetermined archiving criteria downwards, the predetermined archiving criteria including an unused application period of time that is length of time of no application use;
determine usage of the first application by calculating a period of time the first application has gone unused since closing of the first application based on the opening time and the tracked length of use time in the application log; and
upon determining the usage of the first applications satisfies the predetermined archiving criteria by exceeding the adjusted unused application period of time, modify status of the first application so as to archive the first application.

2. The mobile device of claim 1, wherein the execution of the automatic archiver program by the processor further configures the mobile device to perform functions to:
upon the usage of the first application satisfying the predetermined archiving criteria, prompt a user of the mobile device to archive the first application; and
wherein the status of the first application is modified so as to archive the first application upon user input responsive to the prompt to archive the first application.

3. The mobile device of claim 1, wherein the programming further includes an operating system, and wherein the automatic archiver program has root level access to the operating system so as to have access to private data for the plurality of applications.

4. The mobile device of claim 3, wherein the function to modify the status of the first application so as to archive the first application comprises a function to remove the first application from a list of operable applications for the operating system so as to render the first application inaccessible by the operating system without removing the first application from the memory.

5. The mobile device of claim 1, wherein the function to modify the status of the first application so as to archive the first application comprises functions to remove the first application from the memory and transmit data associated with the first application via the wireless transceiver through the network for storage on a storage server.

6. The mobile device of claim 5, wherein the data associated with the first application comprises private data for the first application and a link to install data for the first application.

7. The mobile device of claim 1, wherein the execution of the automatic archiver program by the processor further configures the mobile device to perform functions to:
provide a user interface for application restore operations, wherein the user interface includes a list of archived applications; and
upon receiving a user selection on one of the archived applications from the list of archived applications via the user interface, modify status of the one archived application so as to restore the one archived application.

8. The mobile device of claim 7, wherein the function to modify the status of the one archived application so as to restore the one archived application comprises functions to:
obtain install data for the one archived application via the wireless transceiver;
obtain private data for the one archived application stored on a storage server via the wireless transceiver; and
apply the private data for the one archived application to the install data for the archived application so as to restore the one archived application.

9. The mobile device of claim 7, wherein the function to modify the status of the one archived application so as to restore the one archived application comprises a function to:
add the one archived application to a list of operable applications for an operating system so as to render the one application accessible by the operating system, the one archived application present in the memory but inaccessible by the operating system prior to being added to the list of operable applications for the operating system.

10. The mobile device of claim 1, further comprising at least a first user interface element coupled to the processor and the wireless transceiver, wherein:
the execution of the automatic archiver program by the processor further configures the mobile device to perform functions to:
provide a user interface for application archive operations, via the at least first user interface element, and
prompt the user via the user interface to make a selection in connection with the predetermined archiving criteria; and
the predetermined archiving criteria is determined based upon user input responsive to the prompt of an instruction to make the selection.

11. The mobile device of claim 1, further comprising at least one user interface element coupled to the processor and the wireless transceiver, wherein:
the execution of the automatic archiver program by the processor further configures the mobile device to perform functions to:
provide a user interface for application archive operations, via the at least one user interface element, and
prompt the user via the user interface to select a mode of archiving; and the status of the first application is modified so as to archive the first application according to the selected mode, upon user input responsive to the prompt to select the mode of archiving.

12. The mobile device of claim 1, wherein the execution of the automatic archiver program by the processor further includes functions to:
determine whether update data is available for the archived first application, and upon determining that the update data is available, update the archived first application based on the update data.

13. The mobile device of claim 12, wherein the function to update the archived first application based on the update data comprises a function to:
upon determining that the archived first application is archived at a storage server, update the archived first application based on the update data at the storage server.

14. The mobile device of claim 12, wherein the function to update the first application based on the update data comprises a function to update the first application automatically without user input.

15. The mobile device of claim 14, wherein the execution of the automatic archiver program by the processor further includes a function to:
upon updating the first application automatically without user input, notify a user of the mobile device that the first application is updated.

16. The mobile device of claim 12, wherein the execution of the automatic archiver program by the processor further includes a function to prompt the user to update the archived first application, and wherein the function to update the archived first application based on the update data comprises a function to:
update the first application based on the update data upon user input responsive to the prompt to update the first application.

17. An article of manufacture comprising:
a non-transitory machine readable medium, and
programming embodied in the medium, including an automatic archiver program, wherein execution of the automatic archiver program by a processor of a mobile device configures the mobile device to perform functions, including functions to:
determine an expected-use time that is specific to a first application of a plurality of applications by averaging a plurality of actual uses times of the first application, wherein each actual use time is length of time between when the first application is opened and then closed on the mobile device;
in response to determining the expected-use time, track a length of use time that is time between when the first application is opened beginning at an opening time and when the first application is closed ending at a closing time;
upon determining that the tracked length of use time of the first application exceeds the expected-use time, store the opening time and the tracked length of use time for the first application in an application log in the memory;
in response to storing the opening time and the tracked length of use time in the application log, determining free storage space of the memory of the mobile device;
when the determined free storage space of the memory of the mobile device falls below a predetermined free space amount, adjust predetermined archiving criteria downwards, the predetermined archiving criteria including an unused application period of time that is length of time of no application use;
determine usage of the first application by calculating a period of time the first application has gone unused since closing of the first application based on the opening time and the tracked length of use time in the application log; and
upon determining the usage of the first application satisfies the predetermined archiving criteria by exceeding the adjusted unused application period of time, modify status of the first application so as to archive the first application;
upon determining the usage of the first applications satisfies the predetermined archiving criteria by exceeding the adjusted unused application period of time, prompt a user of the mobile device to archive the first application;
upon user input responsive to the prompt to archive the first application, modify status of the first application so as to archive the first application.

18. The article of claim 17, wherein the automatic archiver program is configured to have root level access to an operating system of the mobile device so as to have access to private data for the plurality of applications.

19. The article of claim 18, wherein the function to modify the status of the first application so as to archive the first application comprises a function to remove the first application from a list of operable applications for the operating system so as to render the first application inaccessible by the operating system without removing the first application from the medium.

20. The article of claim 17, wherein the function to modify the status of the first application so as to archive the first application comprises functions to remove the first application from the memory and transmit data associated with the first application via the wireless transceiver through the network for storage on a storage server.

21. The article of claim 17, wherein the execution of the automatic archiver program by the processor further configures the mobile device to perform functions to:
   provide a user interface for application restore operations, wherein the user interface includes a list of archived applications; and
   upon receiving a user selection on one of the archived applications from the list of archived applications via the user interface, modify status of the one archived application so as to restore the one archived application.

* * * * *